United States Patent
Liu

(10) Patent No.: US 7,814,465 B2
(45) Date of Patent: Oct. 12, 2010

(54) METHOD AND APPARATUS FOR APPLICATION VERIFICATION

(75) Inventor: Lei Liu, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1138 days.

(21) Appl. No.: 11/433,661

(22) Filed: May 12, 2006

(65) Prior Publication Data

US 2007/0266373 A1 Nov. 15, 2007

(51) Int. Cl.
*G06F 9/44* (2006.01)
(52) U.S. Cl. ............... 717/126; 717/124; 717/127; 717/128; 717/131
(58) Field of Classification Search ............... None
See application file for complete search history.

(56) References Cited

U.S. PATENT DOCUMENTS

| 5,655,121 A * | 8/1997 | Delagi et al. ............... 717/124 |
| 5,854,924 A * | 12/1998 | Rickel et al. ............... 717/132 |
| 2006/0123279 A1* | 6/2006 | Cardinell ............... 714/718 |
| 2006/0149845 A1* | 7/2006 | Malin et al. ............... 709/228 |
| 2006/0218537 A1* | 9/2006 | Aroya ............... 717/130 |

* cited by examiner

*Primary Examiner*—Chameli C. Das
*Assistant Examiner*—Isaac T Tecklu
(74) *Attorney, Agent, or Firm*—Osha • Liang LLP

(57) ABSTRACT

A method for verification of an application for zones that includes determining an execution environment of the application, obtaining a list of permissions from the execution environment, analyzing the application to identify a restricted instruction within the application, wherein the restricted instruction is zone specific, and generating a report when a required permission of the restricted instruction is not in the list of permissions.

17 Claims, 7 Drawing Sheets

FIGURE 4C

USER INTERFACE 400 http://www.lab.com:8080/virtualtoolkit/job

APPLICATIONS | VERSIONS

Solaris Enterprise System Virtualization Toolkit

HELP | LOG OUT

Jobs Running: 0
Last Update: Feb 2 2006 11:54:13 AM PST

| System Dashboard | Jobs | Event Log |

Submit Container Verification Job
The table below shows the verification results with detailed description. — 452  462  464

Servers (5) — 460                                                              Filter:

| | Name | Hardware | Success | Description |
|---|---|---|---|---|
| ☐ | 10.0.8.2 — 404 | X2100 | Yes | passed |
| ☐ | MachineA — 406 | T2000 | Yes | passed |
| ☐ | MachineA-vServer1 — 408 | T2000 | Yes | passed |
| ☐ | MachineA-vServer2 — 410 | T2000 | ⚠ Failed | unauthorized system call |
| ☐ | MachineA-vServer3 — 412 | T2000 | Yes | passed |

Submit

View Selector
All Servers
414

CHECKBOX A  420
CHECKBOX B  422
CHECKBOX C  424
CHECKBOX D  426
CHECKBOX E  428

Shortcuts
OS Profiles
Galaxy 2100
Solaris 10x86
Niagara T2000
[New...] [Edit List...]
Updates
[Edit List...]
Firmware
[Edit List...]

466
Jobs
0
0
0
0
0

Copyright A 2005 Sun Microsystems, Inc. All rights reserved
Use is subject to license terms.
Type 'help' for a list of commands, use <Tab> for command completion.
vTool-ok>

COMMAND LINE INTERFACE 450

METHOD AND APPARATUS FOR APPLICATION VERIFICATION

BACKGROUND

The typical computer system includes software and hardware. The software includes all processes that may execute on the computer system, such as web browsers, word processors, software development tools, networking applications, operating system applications, etc. The hardware includes a processor, memory, networking equipment, etc.

In the past several years, hardware and software technologies have advanced at an exorbitant rate. Concerning hardware, for example, memory manufacturers are steadily increasing the amount of available storage on all sizes of computers, chip manufacturers advance processor speeds, and networking is now pervasive. In terms of software, for example, new programming languages have been created and programming language functionality has increased. Further, operating systems, network applications, and other such applications are constantly advancing. Using the greater functionality provided by the new hardware and software technologies have led to more enhanced features in the execution environment of the application.

However, over time, applications must evolve with technology. Specifically, the applications must be compatible with the environment in which the application is to execute. For example, applications that previously executed on operating systems developed twenty years ago may not be able to execute on the newest operating systems of today.

One trivial method for ensuring that an application can execute on the environment intended for the application is to actually execute the application in the new environment in a controlled setting. In this trivial method, various software testers use the execution environment that would be used by users of the application. The software testers must ensure not only that the execution environment is consistent with the users, but also that the input parameters match all possible input parameters of the users. Ensuring both the execution environment and the input parameters are consistent with the use of the application can be cumbersome.

Thus, toolkits are developed. The toolkits typically gather data about the application both before the application is executing and while the application is executing. Specifically, toolkits may perform algorithmic analysis on the application and/or determine the most likely input parameters of the application.

SUMMARY

In general, in one aspect, the invention relates to a method for verification of an application for zones that includes determining an execution environment of the application, obtaining a list of permissions from the execution environment, analyzing the application to identify a restricted instruction within the application, wherein the restricted instruction is zone specific, and generating a report when a required permission of the restricted instruction is not in the list of permissions.

In general, in one aspect, the invention relates to a system for verification of an application that includes an application verification toolkit configured to determine an execution environment of the application, obtain a list of permissions from the execution environment, and analyze the application to identify a restricted instruction within the application, wherein the restricted instruction is zone specific, and a report generator configured to generate a report when a required permission of the restricted instruction is not in the list of permissions.

In general, in one aspect, the invention relates to a user interface for verification of an application that includes a web application configured to receive the application and an execution environment of the application, and obtain a list of permissions from the execution environment, and a report generator configured to generating a report when a required permission of a restricted instruction is not in the list of permissions, wherein the report is generated after analyzing the application to identify the restricted instruction within the application.

Other aspects of the invention will be apparent from the following description and the appended claims.

BRIEF DESCRIPTION OF DRAWINGS

FIGS. 4A-4C show an example for zone application verification in accordance with one or more embodiments of the invention.

DETAILED DESCRIPTION

Figure 1:
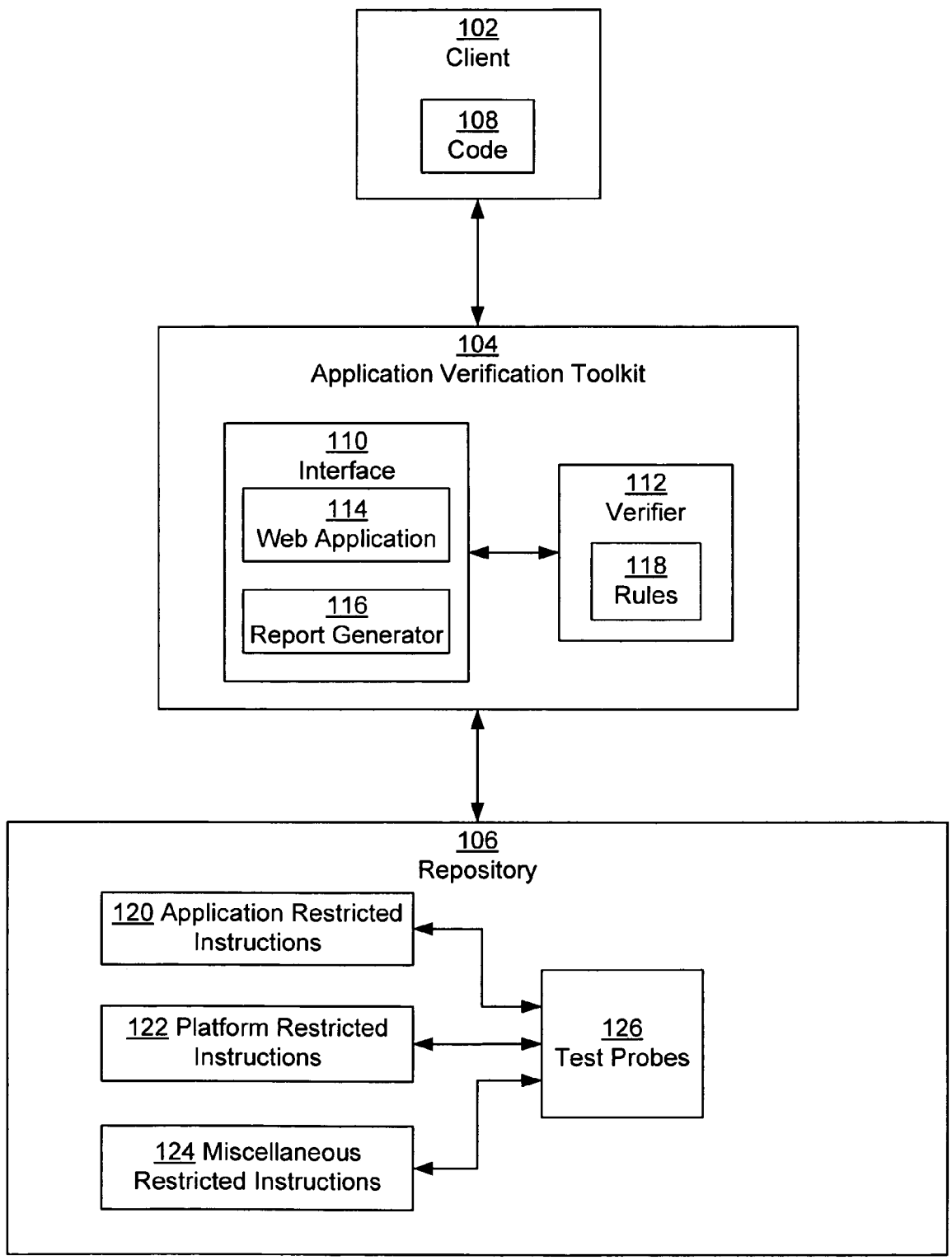
FIG. 1 shows a schematic diagram of a system for zone application verification in accordance with one or more embodiments of the invention

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for verifying that an application can execute in a specific execution environment. Specifically, embodiments of the invention provide a mechanism for determining the permissions of the execution environment. After determining the permissions of the execution environment, embodiments of the invention determine whether an application executing in the execution environment uses restricted instructions such as any restricted application programming interfaces (APIs), restricted system calls, restricted library functions, restricted commands, networking based restricted instructions (e.g., cacheFS) or have security constraints that require different permissions than the permissions of the execution environment.

FIG. 1 shows a schematic diagram of a system for application verification in accordance with one or more embodiments of the invention. As shown in FIG. 1, the system includes a client (102), an application verification toolkit (104), and a repository (106). Each of these components is described below.

The client (102) corresponds to a component that includes functionality to transfer code (108) to an application verification toolkit. Specifically, within the memory of the client (102) is the code (108). The code (108) corresponds to any collection of instructions that, when executed, constitute all or a part of the application. Specifically, the code (102) corresponds to the portion of the application that is verified. The code (102) may correspond to source code or binary code in accordance with one or more embodiments of the invention. Source code corresponds to a collection of instruction in the form that is written by an application developer. Binary code corresponds to instructions that have been processed by a development program. Specifically, binary code corresponds to a format of the application that is ready for execution (i.e., executable code).

Continuing with the client (102) in FIG. 1, the client (102) may additionally include an application development program, such as a source control application. The source control application may include functionality to submit the code (108) to the application verification toolkit (104) (described below) on a scheduled basis, such as nightly, or on request by the application developer.

In accordance with one or more embodiments of the invention, the application verification toolkit (104) corresponds to a tool for verifying that an application is able to execute in a specific execution environment (not shown). The execution environment corresponds to the hardware and/or software environment in which an application is to be executed. Specifically, the execution environment may corresponds to a particular hardware configuration, such as an x86 or an x64 platform, to an application configuration, such as the operating system, container application, or any other such application, or to the environment of the user. The execution environment typically includes a group of permissions. The permissions correspond to the access capabilities of an application in the execution environment. For example, the permissions may include a set of restricted instructions (e.g., APIs, system calls, library functions, commands, etc.) that are available to an application, the resources that an application may use, and the resources that are not available to the application. For example, the permissions may specify that an application in a particular execution environment has access to read from specific files, but not write to specific files. The permissions may also specify that an application in a particular execution environment may not access a specific service directly, but rather must use a particular management interface. Accordingly, a restricted instruction in the application for accessing the service must specify the management interface.

Continuing with the application verification toolkit, the application verification toolkit includes an interface (110) and a verifier (112). The interface (110) corresponds to a component that includes functionality to communicate with the client (102). In accordance with one or more embodiments of the invention, the interface (110) includes a web application (114) and a report generator (116). The web application (114) includes functionality to receive the code (108) and information about the execution environment from the client (102). In one or more embodiments of the invention, the web application is Internet based. Specifically, the web application (114) is associated with a URL of the client. Those skilled in the art will appreciate that rather than interfacing with a web application, an application that provides the functionality provided by the application verification toolkit may exist locally on the client (102).

The report generator (116) includes functionality to receive results of the verification of the application and concatenate the results into a report (not shown). In one or more embodiments of the invention, the report includes information regarding whether the code (108) passed the verification process. If the code did not pass the verification process, then the report also contains information regarding which restricted instruction in the code caused the error and the portion of the code that used the restricted instruction.

Continuing with the application verification toolkit (104) of FIG. 1, the interface (110) is connected to the verifier (112). In one or more embodiments of the invention, the verifier includes functionality to determine whether the code (108) uses any restricted instructions that the execution environment of the code (108) would not have permission to use. The verifier (112) includes a set of rules (118) in accordance with one or more embodiments of the invention. The rules (118) specify the restricted instructions that a given execution environment does not have permission to use. Specifically, the rules correlate the restricted instructions with the execution environment.

A repository (106) is connected to the application verification toolkit (104) in accordance with one or more embodiments of the invention. The repository (106) corresponds to any storage unit for data, such as a database, file system, directory server, disks, etc. The repository (106) contains lists of restricted instructions (e.g., application restricted instructions (120), platform restricted instructions (122), miscellaneous restricted instructions (124)). In one or more embodiments of the invention, the lists of restricted instructions are divided into categories. Specifically, the categories include application restricted instructions (120), platform restricted instructions (122), and miscellaneous restricted instructions (124). The application restricted instructions (120) correspond to restricted instructions that are application specific. The application restricted instructions may also include a list of restricted instructions that a user cannot use, but would be acceptable for an administrator to use. Thus, if the execution environment is for the user, then the code (108) cannot contain an administrator specific restricted instruction.

Continuing with FIG. 1, another category of restricted instructions are platform specific restricted instructions (122). The platform specific restricted instructions (122) correspond to the set of restricted instructions that are for specific hardware and operating system. For example, the restricted instructions that are specific to an x86 architecture may be included in the platform specific set of restricted instructions. Further, if the execution environment includes a specific operating system, then the code cannot use restricted instructions for other operating systems. Accordingly, in the example, the platform restricted instructions (122) contain the list of restricted instructions that are specific to different operating systems.

The categories of restricted instructions may also include miscellaneous restricted instructions (124). The miscellaneous restricted instructions (124) correspond to any remaining restricted instruction that the code (108) should not include because the code does not have appropriate permissions or does not have access to use.

Continuing with the repository (106) of FIG. 1, the repository (106) also includes test probes (126) in accordance with one or more embodiments of the invention. The test probes (126) correspond to small programming modules that can be embedded into code. The test probes (126) include functionality to trace the execution of the code and output the trace. Accordingly, the test probes (126) include functionality to test for specific restricted instructions and output the restricted instructions that are used in the code (108). In one or more embodiments of the invention, the test probes (126)

are restricted instruction specific. In particular, each probe is used to test for a single restricted instruction.

Figure 2:
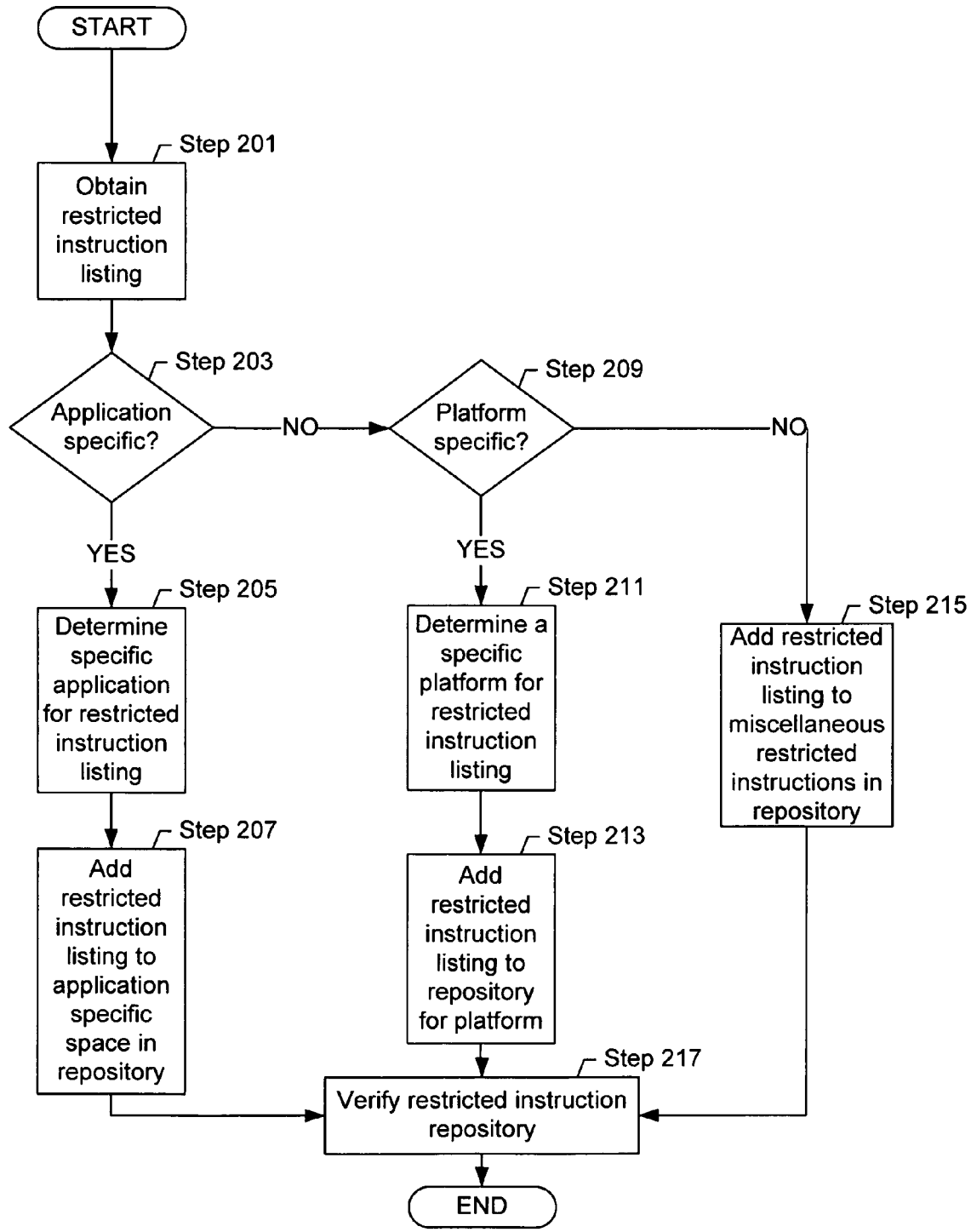
FIG. 2 shows a flowchart of a method for adding restricted instructions to a restricted list in accordance with one or more embodiments of the invention.

FIG. 2 shows a flowchart of a method for adding restricted instructions to a restricted list in accordance with one or more embodiments of the invention. Specifically, FIG. 2 shows a flowchart of a method for adding restricted instructions to the specific area in the repository.

Initially, a restricted instruction listing including restricted instructions is obtained (Step 201). Specifically, a listing of restricted instructions is obtained. The restricted instruction listing may be obtained, for example, by searching a variety of knowledge sources. For example, the restricted instruction listing may be obtained from the website of an application or platform vendor, or from a third party source. Before adding the restricted instruction listing to the repository, those skilled in the art will appreciate that the system may verify that the restricted instruction listing is not already found in the restricted instruction repository. For example, an administrator may review a list of all the restricted instructions (i.e., a restricted instruction listing).

After obtaining the restricted instruction listing, a determination is made whether the restricted instruction listing is application specific (Step 203). In particular, a determination is made whether the restricted instruction listing is for a particular application. If the restricted instruction listing is application specific, then the specific application for the restricted instruction is determined (Step 205). The application may be determined from the restricted instructions and the vendors. Specifically, each restricted instruction is associated with an application to which the restricted instruction is an interface. Accordingly, the application can be determined from the restricted instruction. Next, the restricted instruction listing is added to the application specific space in the repository (Step 207).

Alternatively, if the listing of restricted instructions is not application specific, then a determination is made whether the listing of restricted instructions is platform specific in accordance with one or more embodiments of the invention (Step 209). Those skilled in the art will appreciate that a restricted instruction may be both application specific and platform specific.

If the restricted instruction is platform specific, then the specific platform for the restricted instruction is determined (Step 211). Determining the specific platform for the restricted instruction may be performed, for example, by accessing knowledge sources known in the art. Once the platform is determined, then the restricted instruction listing is added to the repository for the specific platform (Step 213).

Alternatively, if the restricted instruction listing is not platform specific, then the restricted instruction listing is added to the miscellaneous space in the repository (Step 215). The process of adding restricted instructions to the repository may continue until repository is completely populated with the necessary restricted instructions.

In one or more embodiments of the invention, after adding the restricted instruction listing to the repository, the restricted instruction repository is verified (Step 217). Specifically, a developer, administrator, or agent, may review the restricted instruction repository to ensure that all restricted instructions that should be listed are listed and that all restricted instructions that are listed should be listed.

Figure 3:
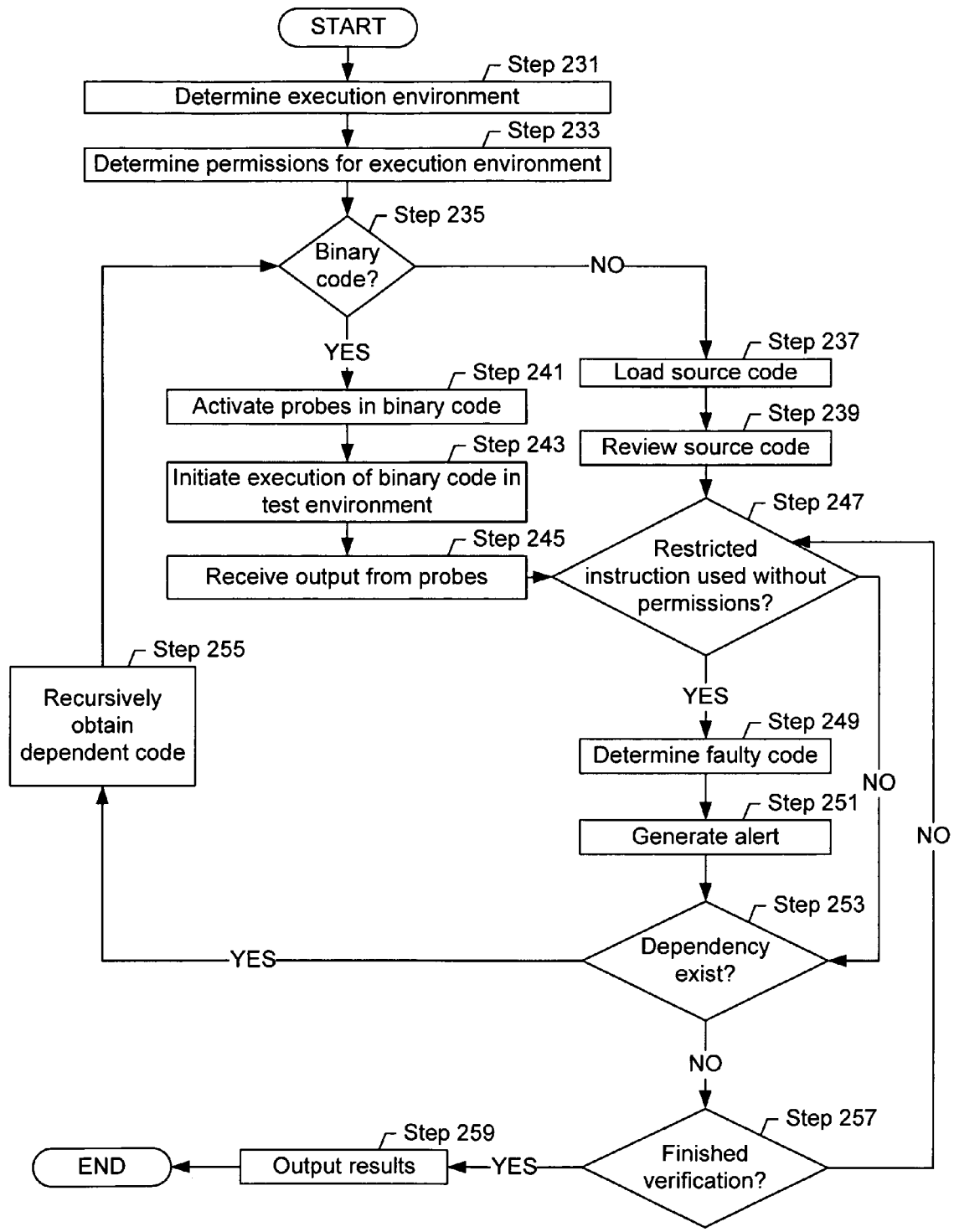
FIG. 3 shows a flowchart of a method for zone application verification in accordance with one or more embodiments of the invention.

Once the repository is populated with the restricted instructions from the listings, then the repository may be used to verify an application. FIG. 3 shows a flowchart of a method for application verification in accordance with one or more embodiments of the invention. Initially, the execution environment is determined (Step 231). The execution environment may be determined from the user or may be detected automatically. Specifically, the user may specify the hardware and operating system of the application. Further, the user may specify any previous applications executing on the hardware where the application is to be deployed.

Next, the permissions for the execution environment is determined (Step 233). The permissions for the execution environment can be determined from knowledge sources or from the user. Specifically, the user may specify that the application is to be executed by a user or within a certain area within the system.

After determining the set of permissions for the execution environment, a determination is made whether the application is in binary code (Step 235). In accordance with one or more embodiments of the invention, if the application is in binary code, then probes in the binary code are activated (Step 241). At this stage, the probes may be added to the binary code or the probes may be preexisting in the binary code. Activating the probes in the binary code may be performed, for example, by changing parameters either before or during execution of the binary code. Further, in one or more embodiments of the invention, only the probes that relate to the restricted instructions are activated. Specifically, using the rules of the verifier, at this stage, only the probes specified by the rules are activated.

Further, in one or more embodiments of the invention, the probes correspond to Dtrace probes, developed by Sun Microsystems™, Inc. (located in Santa Clara, Calif.). Dtrace probes may be executed dynamically without changing the source code. Accordingly, a Dtrace probe may verify for restricted instructions and/or permission without requiring source code changes.

Accordingly, the execution of the binary code is then initiated in a test environment (Step 243). While the code is executing, output from the probes is received (Step 245). The output may specify the portion of the application that is executing and which restricted instructions are used in the code.

Alternatively, if the application is not in binary code, then the application is most likely in source code. Accordingly, the source code is loaded into the verifier (Step 237). Next, the source code is reviewed for the presence of restricted instructions. Specifically, the restricted instructions in the source code are checked against the restricted instructions in the repository.

Regardless of whether the application is in the source code or in binary code, a determination is made whether any of the restricted instructions are used without permission (Step 247). Specifically, a determination is made whether any restricted instructions exist in the application that should not be in the application.

If restricted instructions that are used without permission exist, then the faulty code is determined (Step 249). The faulty code corresponds to the portion of the application that has the restricted instruction that is used without permission. Determining the faulty code may be performed by the probe of the verifier when the restricted instruction is found.

Once the faulty code is determined, then an alert is generated (Step 251) in accordance with one or more embodiments of the invention. At this stage, the alert may halt the verification process or remain unreported to the client until the verification process completes.

If restricted instructions are used with permissions or after the alert is generated, then a determination is made whether a dependency exists in the application (Step 253). A dependency exists in the application if the application calls on one or more other applications. Specifically, the application may use an unrestricted API to call a separate application. Accordingly, the dependent code is recursively obtained (Step 255). Next, the dependent code is verified starting with Step 235 using the same permissions and execution environment as the original application in accordance with one or more embodiments of the invention. Those skilled in the art will appreciate that verifying the dependent code may be performed recursively or iteratively.

Alternatively, if a dependency does not exist in the application or if all dependencies have been verified, then a determination is made whether the verification is finished. Specifically, a determination is made whether the application has completed the verification process. If the verification is not finished, then the remainder of the application is verified starting with Step 247.

Once the verification of the application completes, then the results of the verification are outputted (Step 259). Specifically, a report is generated that shows which restricted instructions are used in which the application did not have permission to use the restricted instruction. The report may be outputted to the display (e.g., screen) of the client, transmitted to a managing application executing on the client, or transmitted to the memory of the client. Those skilled in the art will appreciate that a report may only be generated if a restricted instruction is used without the required permission.

In one or more embodiments of the invention, the report is used to perform an action on the code. Specifically, the client may remove the faulty code by removing the restricted instruction or using a different restricted instruction. Once the faulty code is removed, the application may be re-verified using the application verification toolkit. Alternatively, the client may also use the information to add in a specification of the application that the application should not be used in the particular execution environment. Those skilled in the art will appreciate that other corrective actions may also be performed.

Figure 4A:
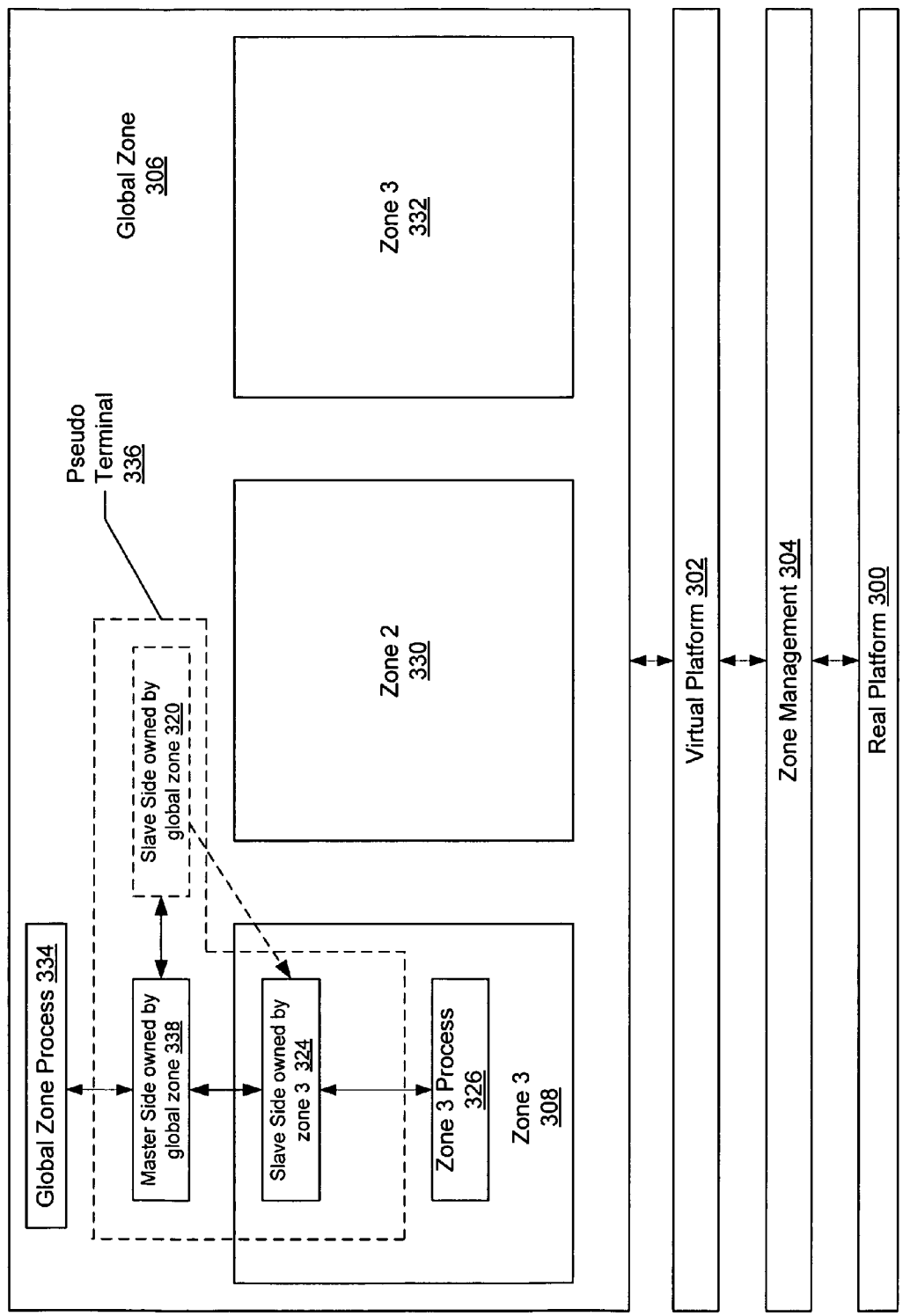
Figure 4B:
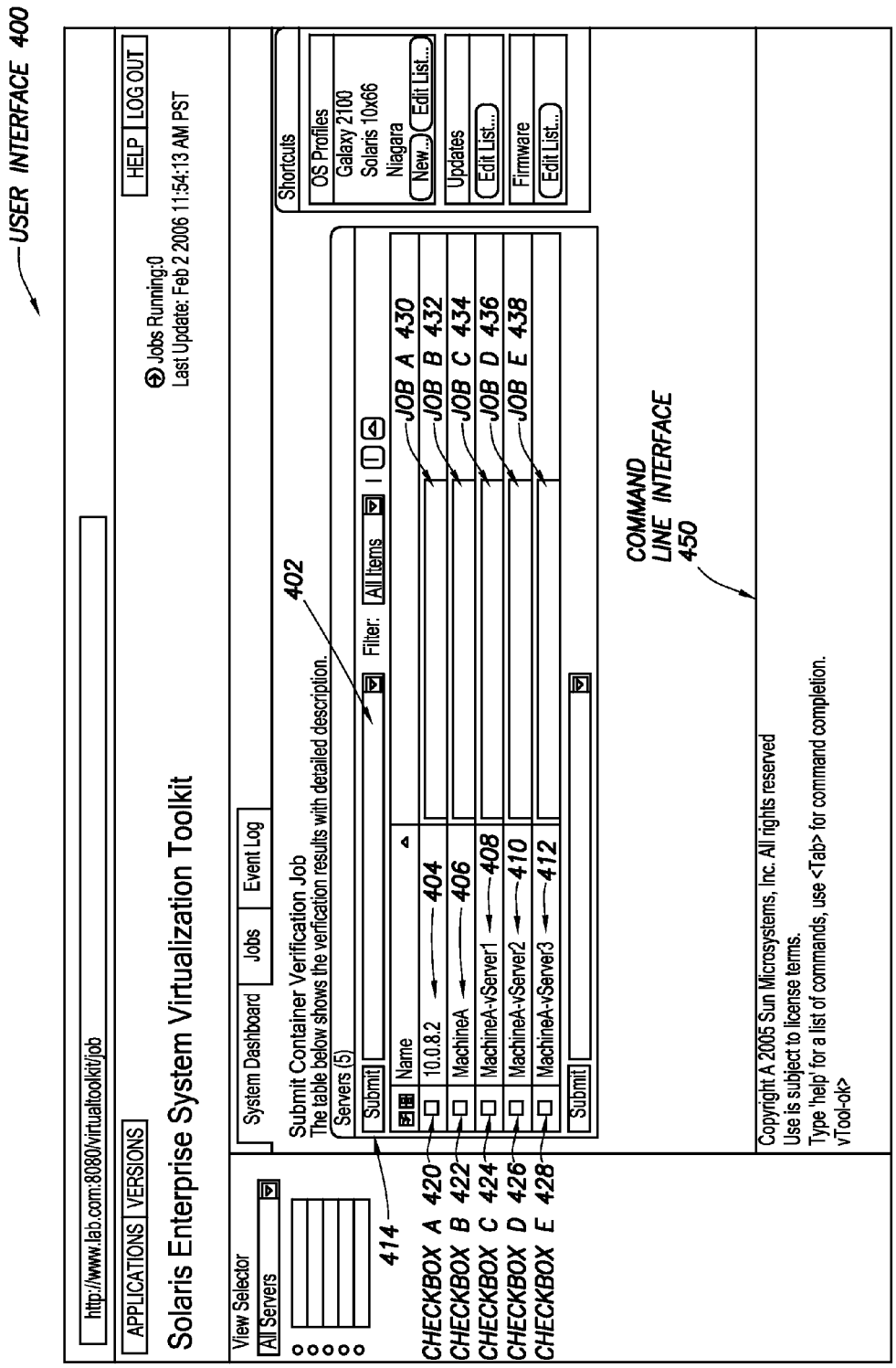

FIGS. 4A-4C show an example for zone application verification in accordance with one or more embodiments of the invention. In the following example, consider the case in which a developer is trying to determine whether an application will execute in non-global zone of a zone architecture. Specifically, the execution environment in the example is the non-global zone of the zone architecture.

FIG. 4A describes a zone architecture of the execution environment in accordance with one or more embodiments of the invention. The zone architecture includes a real platform (300). The real platform (300) may include one or more of the following components: physical resources (i.e., network interfaces, network devices, interfaces to data repositories, etc.) of the system, core operating system services, remote administering monitoring services, platform administrative services, etc. The real platform (300) interfaces with the virtual platform (302), via a zone management layer (304). The zone management layer (304) typically includes functionality to administer one or more zones (i.e., a global zone (306), zone 3 (308), zone 2 (330), zone 3 (332), etc.).

The virtual platform (302) typically includes a set of services and resources that allow full functionality of the zone architecture. For example, the virtual platform (302) may include network interfaces, devices, administration utilities, etc. The virtual platform (302) may interface with one or more zones i.e., a global zone (306), zone 3 (308), zone 2 (330), zone 3 (332)).

In one or more embodiments of the invention, each non-global zone (i.e., zone 3 (308), zone 2 (330), zone 3 (332)) provides an isolated environment for running applications. Processes running in a given zone are prevented from monitoring or interfering with other activities in the system. Access to other processes, network interfaces, file systems, devices, and inter-process communication facilities is restricted to prevent interaction between processes in different zones. The permissions available within a zone are restricted to prevent operations with system-wide impact. In one embodiment of the invention, each zone (i.e., zone 3 (308), zone 2 (330), zone 3 (332)) may be identified by an alphanumeric name and a numeric ID.

The zones (i.e., zone 3 (308), zone 2 (330), zone 3 (332)) are typically configured and administered using the utilities provided by the zone management (304) layer. These utilities may allow an administrator to specify the configuration details of a zone, install file system contents (including software packages) into the zone, manage the runtime state of the zone, etc. In addition, a pseudo-terminal utility may allow an administrator to run commands within an active zone, without logging into the zone through a network-based login server, such as rlogind or sshd.

A global zone (306) manages the previously mentioned non-global zones (e.g., zone 1 (308), zone 2 (330), zone 3 (332)). The global zone (306) always exists, and acts as the "default" zone in which all processes run if no zones have been created. Further, in one or more embodiments of the invention, the global zone (306) is the general operating environment that is created when the OS is booted and executed, and serves as the default zone in which processes may be executed if no non-global zones (e.g., zone 1 (308), zone 2 (330), zone 3 (332)) are created/present. In the global zone (306), administrators and/or processes having the proper rights and permissions may generally perform any task and access any device/resource that is available on the computer system on which the OS is run. Thus, processes running in the global zone (306) typically have the same set of permissions available on a system running without zones, i.e., permissions to load kernel modules, access physical devices, etc. Further, an administrator logged into the global zone (306) may monitor and control the system as a whole (including the physical devices and network interface that are hidden from the other non-global zones).

The zone architecture shown in FIG. 4A allows the physical system to be separated into isolated individual portions. Having non-global zones that are isolated from each other may be desirable in many applications. For example, if a single computer system running a single instance of an OS is to be used to host applications for different competitors (e.g., competing websites), then it would be desirable to isolate the data and processes of one competitor from the data and processes of another competitor. That way, it can be ensured that information is not being leaked between the competitors. Partitioning the OS into non-global zones and hosting the applications of the competitors in separate non-global zones is one possible way of achieving this isolation.

While isolating individual portion of a computer system using zones is advantageous from a security and virtualization perspective, the zone architecture requires additional mechanisms to facilitate communication of processes and resources between zones without using network-based login servers. In one embodiment of the invention, pseudo-terminals are provided that facilitate non-network-based login servers while maintaining isolation between the respective zones.

In one embodiment of the invention, the ownership component allows the pseudo-terminals to bridge zones (i.e., global to non-global zones, and non-global to non-global zones) and accordingly, bridge isolated file systems (i.e., bridge the individual file systems associated with each zone). Thus, in accordance with one embodiment of the invention, each zone may open a pseudo-terminal within the zone (i.e., within the file-system associated with the zone) and also open a pseudo-terminal that bridges zones (i.e., bridges the file system of two isolated zones).

Specifically, in one embodiment of the invention, each pseudo-terminal includes an ownership component. More specifically, each pseudo-terminal is owned by a particular zone and visible to all zones, regardless of whether the pseudo-terminal is in use. When a pseudo-terminal is opened within a given non-global zone (e.g., zone 3 (308), zone 2 (330), zone 3 (332)) the pseudo-terminal is owned by the zone that opened the pseudo-terminal.

Similarly, when a pseudo-terminal is opened in the global zone (306) the pseudo-terminal is owned by the global zone (306). However, when a pseudo-terminal is opened in the global zone (306), the global zone (306) may transfer ownership of the slave side of the pseudo-terminal to a target zone (i.e., a non-global zone) thereby forming a communication channel between the global zone (306) and the target zone.

In one embodiment of the invention, the ownership component of the pseudo-terminals is maintained by the global zone (306). The ownership component may be represented as a flat text file, an array indexed by pseudo-terminals, or any other data structure that can store ownership information. The ownership information may include the alphanumeric name of the zone, the numeric ID of the zone, any other means of uniquely identifying the zone, or a combination thereof.

Returning back to FIG. 4A, a global process (334) may open a pseudo-terminal (336) having a master side owned by the global zone (338) and a slave side owned by the global zone (320). The global zone (306) may subsequently transfer ownership of the slave side (320) of the pseudo-terminal (336) from the global zone (306) to the target zone, which in FIG. 4A is zone 3 (308). Thus, the ownership of the master side (338) is retained by the global zone (306), while the slave side becomes owned by zone 3 (324) and is transferred into zone 3 (308). This allows the global zone process (334) to communicate with a zone 3 process (326).

In the zone architecture, certain APIs are restricted to only the global zone. The following are tables that include examples of restricted APIs in a zone execution environment in accordance with one or more embodiments of the invention. Table 1 shows a list of restricted APIs for restricted interfaces when they are called in a non-global zone in accordance with one or more embodiments of the invention.

TABLE 1

Non-global Zone Restricted Interfaces Registry

| Interface | Description |
| --- | --- |
| Adjtime(2) | correct the time to allow synchronization of the system clock |
| ioctl(2) device control, ioctl(2) | with I_POP and STREAMS anchors in place |
| link(2)/unlink(2) | link to a directory |
| memcntl(2) | memory management control with MC_LOCK, MC_LOCKAS, MC_UNLOCK or MC_UNLOCKAS |
| Mknod(2) | make a directory, a special file, or a regular file with S_IFCHR and S_IFBLK as file type |
| msgctl(2) | message control operations with IPC_SET and raising msg_qbytes |
| ntp_adjtime(2) | adjust local clock parameters |
| p_online(2) | return or change processor operational status P_ONLINE, P_OFFLINE, P_NOINTR, P_FAULTED, P_SPARE, and P_FORCED |

TABLE 1-continued

Non-global Zone Restricted Interfaces Registry

| Interface | Description |
| --- | --- |
| Priocntl(2) | process scheduler control with PC_SETPARMS, PC_SETXPARMS, and PC_ADMIN |
| priocntlset(2) | generalized process scheduler control with PC_SETPARMS, PC_SETXPARMS, and PC_ADMIN |
| pset_bind(2) | bind LWPs to a set of processors |
| pset_create(2), pset_destroy(2), pset_assign(2) | manage sets of processors |
| pset_setattr(2) | set processor set attributes |
| shmctl(2) | shared memory control operations with SHM_LOCK and SHM_UNLOCK |
| socket(2) | create an endpoint for communication with SOCK_RAW |
| stime(2) | set system time and date |
| swapctl(2) | manage swap space with SC_ADD and SC_REMOVE swapping resources |

Table 2 shows a list of restricted library functions when the library functions are called in a non-global zone in accordance with one or more embodiments of the invention.

TABLE 2

Library Function Registry

| Function | Description |
| --- | --- |
| clock_settime(3RT) | set high-resolution clock operations |
| cpc_bind_cpu(3CPC) | bind request sets to hardware counters |
| libdevinfo(3LIB) | device information library |
| libcfgadm(3LIB) | configuration administration library |
| libpool(3LIB) | pool configuration manipulation library |
| libkvm(3LIB) | Kernel Virtual Memory access library |
| Libtnfctl(3LIB) | TNF probe control library |
| mlock(3C)/munlock(3C) | lock or unlock pages in memory |
| mlockall(3C)/munlockall(3C) | lock or unlock address space |
| plock(3C) | lock or unlock into memory process, text, or data |
| timer_create(3RT) | create a timer with CLOCK_HIGHRES |
| t_open(3NSL) | establish a transport endpoint with /dev/rawip |
| settimeofday(3C) | get or set the date and time |

Table 3 shows a list of restricted commands when the commands are called in a non-global zone in accordance with one or more embodiments of the invention.

TABLE 3

Command Registry

| Command | Description |
| --- | --- |
| add_drv(1M)/ rem_drv(1M) | add/remove a new device driver to the system |
| arp(1M) | address resolution display and control |
| autopush(IM) | configure lists of automatically pushed STREAMS modules |
| Cfgadm(1M) | configuration administration |
| Cpustat(1M) | monitor system behavior using CPU performance counters |
| devfsadm(1M) | administration command for /dev |
| devlinks(1M) | add /dev entries for miscellaneous devices and pseudodevices |
| dispadmin(1M) | process scheduler administration |
| disks(1M) | create /dev entries for hard disks attached to the system |
| drvconfig(1M) | apply permission and ownership changes to devices |

TABLE 3-continued

Command Registry

| Command | Description |
| --- | --- |
| dtrace(1M) | DTrace dynamic tracing compiler and tracing utility |
| Intrstat(1M) | report interrupt statistics |
| ipf(1M) | and related IP filter commands -- alter packet filtering lists for IP packet input and output |
| modload(1M)/ modunload(1M) | load/unload a kernel module |
| plockstat(1M) | report user-level lock statistics |
| pooladm(1M) | activate and deactivate the resource pools facility |
| Poolcfg(1M) | create and modify resource pool configuration files |
| poolbind(1M) | bind processes, tasks, or projects or query binding of processes to resource pools |
| ports(1M) | creates /dev entries and inittab entries for serial lines |
| Prtconf(1M) | print system configuration |
| Prtdiag(1M) | display system diagnostic information |
| psrset(1M) | creation and management of processor sets |
| route(1M) | manually manipulate the routing tables |
| share(1M) | make local resource available for mounting by remote systems |
| snoop(1M) | capture and inspect network packets |
| tapes(1M) | create /dev entries for tape drives attached to the system |
| trapstat(1M) | report trap statistics |
| date(1) | write the date and time |
| nca(1) | the Solaris Network Cache and Accelerator (NCA) |

Table 4 shows a list of restricted device file APIs when the device file APIs are called in a non-global zone in accordance with one or more embodiments of the invention.

TABLE 4

Device File Registry

| Device | File Description |
| --- | --- |
| uscsi(7I) | user SCSI command interface |
| mem(7D)/kmem(7D)/ allkmem(7D) | physical or virtual memory access |
| kmdb(7D) | in situ kernel debugger |
| Ksyms(7D) | kernel symbols |
| dtrace(7D) | DTrace dynamic tracing facility |
| lockstat(7D) | DTrace kernel lock instrumentation provider |
| cpuid(7D) | CPU identification driver |
| fcip(7D) | IP/ARP over fibre channel datagram encapsulation drive |
| hme(7D), ce(7D), ge(7D), eri(7D), bge(7D), dmfe(7D), dnet(7D), e1000g(7D), elxl(7D), iprb(7D), pcelx(7D), pcn(7D), qfe(7D), rtls(7D), sk98sol(7D), skfp(7D), and spwr(7D) | All NIC device nodes that support the DLPI programming interface are not accessible in a non-global zone |

Further, an application that executes in the zone architecture is restricted in terms of the types of system calls, library functions, and commands allowed. Specifically, in a zone environment, an application is restricted to only the privileges necessary to perform a job. A process rights manager enforces the restriction using the concept of privilege sets. In one or more embodiments of the invention, each process has four sets of privileges. The four sets of privileges include the effective privilege set, the permitted privilege set, the limit privilege set, and the zone process privileges. Each of the listed privilege sets are described below.

In one or more embodiments of the invention, the effective privilege set corresponds to the set of privileges that a program uses at the time of execution. Specifically, the effective privilege set may be used to determine whether a process can use a particular privilege.

In order for a privilege to be in the effective privilege set, the privilege must also be in the permitted set. In one or more embodiments of the invention, a permitted privilege set corresponds to the set of privileges that is available for use by a process. Privileges may be available to a program from inheritance or from assignment. Accordingly, the permitted set is a subset of the inheritable set.

Continuing with the example, an inheritable privilege set corresponds to the set of privileges that a process can inherit from a parent process. The privilege a child process may inherit is controlled by how the process was initiated, and by the permitted set for the child process.

For example, with regards to users, the inheritable set includes a basic set of privileges in accordance with one or more embodiments of the invention. Specifically, programs that are initiated with a call to "fork(2)" inherit all privileges from the parent process and can add new privileges to the process. In contrast, programs that are initiated using a call to "exec(2)" inherit all the privileges from the parent process without being able to add any new privileges.

Finally, in one or more embodiments of the invention, a limit privilege set corresponds to the upper bound of privileges that a process and children of the process may inherit. By default, the limit set is set as all privileges. Thus, if a user is assigned a profile that includes a program that has been assigned privilege, the user can execute the program because the assigned privileges are within the user's limit set. Further, all privileges in the permitted set might not be used at the time of execution. In addition, the limit set is only enforced at the call to "exec(2)" time. Thus, a process is allowed to drop privileges used before "exec(2)" after "exec(2)". The relationship between the privilege sets corresponds to the permitted set is a subset of the inheritable set. Further, the inheritable set is limited by the value of the limit set.

Processes in a non-global zone are constrained by the privilege sets that are assigned to the processes when created. Table 5 shows a list of system calls, library functions, and commands that can return errors when they are called in a non-global zone in accordance with one or more embodiments of the invention.

TABLE 5

System calls, library functions, and commands

| All Privileges | Zone Privileges |
| --- | --- |
| PRIV_CONTRACT_EVENT | PRIV_CONTRACT_EVENT |
| PRIV_CONTRACT_OB-SERVER | PRIV_CONTRACT_OB-SERVER |
| PRIV_CPC_CPU | |
| PRIV_DTRACE_PROC | |
| PRIV_DTRACE_USER | |
| PRIV_DTRACE_KERNEL | |
| PRIV_FILE_CHOWN | PRIV_FILE_CHOWN |
| PRIV_FILE_CHOWN_SELF | PRIV_FILE_CHOWN_SELF |
| PRIV_FILE_DAC_EXECUTE | PRIV_FILE_DAC_EXECUTE |
| PRIV_FILE_DAC_READ | PRIV_FILE_DAC_READ |
| PRIV_FILE_DAC_SEARCH | PRIV_FILE_DAC_SEARCH |
| PRIV_FILE_DAC_WRITE | PRIV_FILE_DAC_WRITE |
| PRIV_FILE_LINK_ANY | PRIV_FILE_LINK_ANY |
| PRIV_FILE_OWNER | PRIV_FILE_OWNER |
| PRIV_FILE_SETID | PRIV_FILE_SETID |
| PRIV_IPC_DAC_READ | PRIV_IPC_DAC_READ |
| PRIV_IPC_DAC_WRITE | PRIV_IPC_DAC_WRITE |

TABLE 5-continued

System calls, library functions, and commands

| All Privileges | Zone Privileges |
|---|---|
| PRIV_IPC_OWNER | PRIV_IPC_OWNER |
| PRIV_NET_ICMPACCESS | PRIV_NET_ICMPACCESS |
| PRIV_NET_PRIVADDR | PRIV_NET_PRIVADDR |
| PRIV_NET_RAWACCESS | |
| PRIV_PROC_CHROOT | PRIV_PROC_CHROOT |
| PRIV_PROC_CLOCK_HIGH-RES | |
| PRIV_PROC_AUDIT | PRIV_PROC_AUDIT |
| PRIV_PROC_EXEC | PRIV_PROC_EXEC |
| PRIV_PROC_FORK | PRIV_PROC_FORK |
| PRIV_PROC_INFO | PRIV_PROC_INFO |
| PRIV_PROC_LOCK_MEMORY | |

Continuing with the example, suppose the developer wants to ensure that the application complies with the zone architecture described in FIG. 4A and in the above tables. Specifically, the developer needs to ensure that all restricted instructions that are used in the application and in any dependent code are for non-global zones. Accordingly, the restricted instructions cannot be in the above restricted tables. Thus, in the example, the developer accesses the zone application verification toolkit. FIGS. 4B-4C show an example user interface (400) that the developer may use to test whether the application can execute in a zone environment.

Specifically, FIG. 4B shows an example user interface (400) for the developer to request verification of the application. As shown in FIG. 4B, the developer may have multiple execution environments to choose from for the application. Specifically, each execution environment is represented by a machine (e.g., 10.0.8.2 (404), MachineA (406), MachineA-vServer1 (408), MachineA-vServer2 (410), MachineA-vServer3 (412)).

In FIG. 4A, the application verification may include both a non-zone architecture, such as the architecture represented by 10.0.8.2 (404), and zone architectures, such as the architectures of MachineA (406), MachineA-vServer1 (408), MachineA-vServer2 (410), MachineA-vServer3 (412). MachineA (406) represents the execution environment of a global zone. The remaining machines (e.g., MachineA-vServer1 (408), MachineA-vServer2 (410), MachineA-vServer3 (412)) represent the execution environment of non-global zones.

Accordingly, the developer first chooses the execution environment of the application by selecting checkboxes (e.g., checkbox A (420), checkbox B (422), checkbox C (424), checkbox D (426), checkbox E (428)) associated with the execution environment to verify.

Next, in order to submit the request, the developer either types in or chooses the application from a drop-down box (402) and selects the submit button (414). After selecting the submit button, the job is added to the job box (e.g., Job A (430), Job B (432), Job C (434), Job D (436), Job E (438)) and the binary code or source code of the application is sent to the machines for verification. Alternatively, the developer may choose to use the command line interface (450) to submit the requests to individual machines.

Continuing with the example, the code is verified. Specifically, code is checked for the presence of any restricted instructions listed in the above tables. More specifically, if the application is binary code, then the probes are added to the code (if necessary) and activated. Next, the binary code is executed. Further, any code in which the binary code is dependent also has probes activated and is also executed. The output of the probes is then sent to the developer.

Alternatively, if the application is source code, then the code is scanned for the presence of the restricted instructions in the tables. Further, any application on which the source code is dependent is also verified. The results of the scanning are sent to the developer.

Regardless of whether the application is source code or binary code, FIG. 4C shows an example user interface (400) for returning the results to the developer. As shown in FIG. 4C, the developer can view the hardware profile (460), whether the verification was a success (462), a description of the verification process (464), and the number of remaining jobs (466) on each machine (e.g., checkbox A (420), checkbox B (422), checkbox C (424), checkbox D (426), checkbox E (428)).

Further, in the example user interface (400), the developer may choose a specific checkbox (e.g., checkbox A (420), checkbox B (422), checkbox C (424), checkbox D (426), checkbox E (428)) to obtain a description of the results. Specifically, a developer either enters information into the drop down box (452) or selects a checkbox (e.g., checkbox A (420), checkbox B (422), checkbox C (424), checkbox D (426), checkbox E (428)) and selects the discover button (454). In the example, MachineA-vServer2 (410) did not pass the verification. Accordingly, the developer may choose the checkbox D (426) associated with MachineA-vServer2 (410) and select the discover button (454).

Using the description about the verification of the application on MachineA-vServer2 (410) allows the developer to perform a corrective action on the application. Specifically, the developer may remove the faulty portion of the code and re-verify the application.

Figure 5:
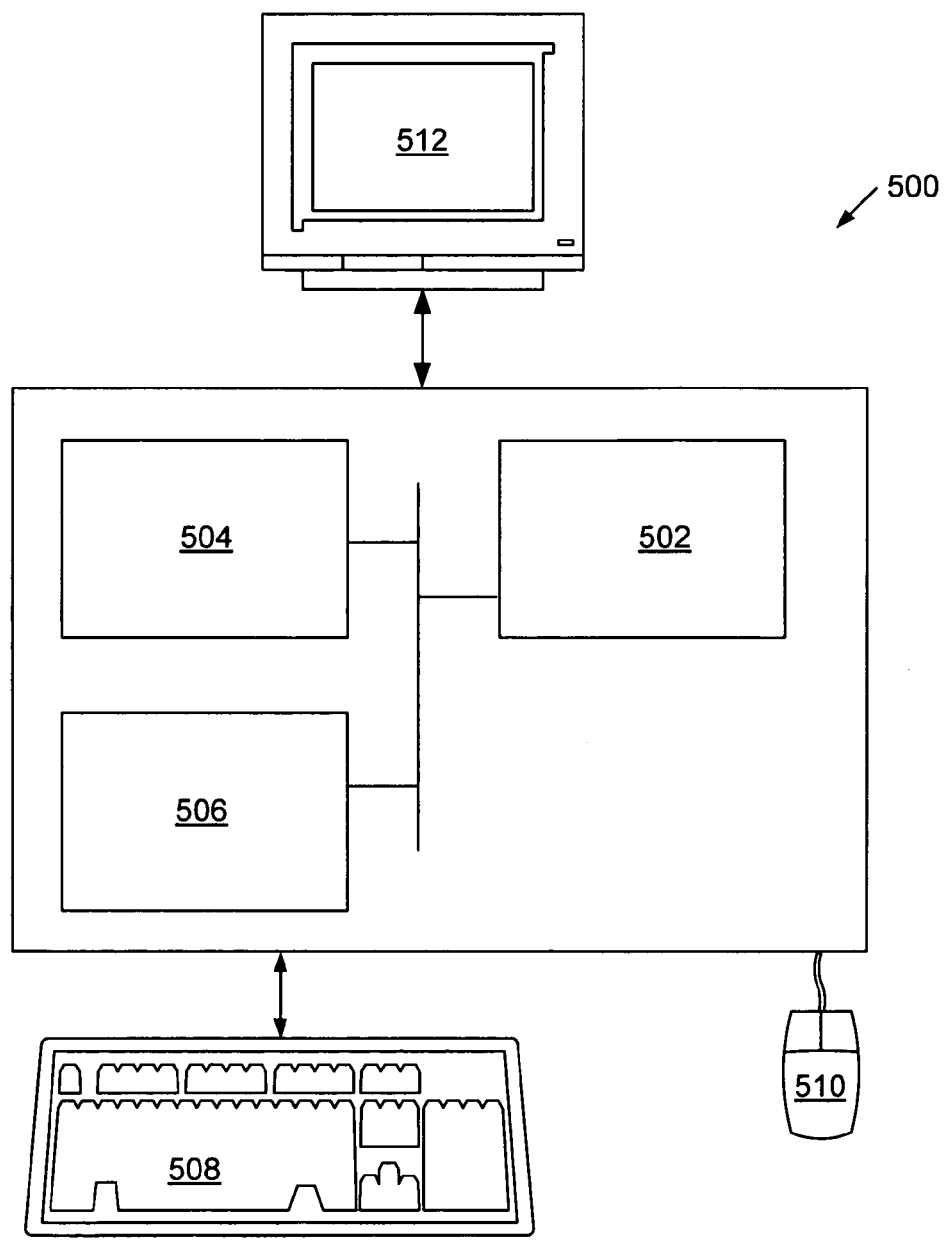
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., repository, verification trigger, zone application verification toolkit, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention allow for a simple solution to verify an application. Specifically, a client interacts with a simple user interface and receives a report that includes the restricted instructions in accordance with one or more embodiments of the invention. Further, embodiments of the invention interface easily with source control applications and testing application that may submit job requests to the interface to verify the application.

Moreover, because the verification toolkit verifies the APIs and the permissions of the execution environment, embodiments of the invention provide a mechanism whereby a developer and/or an administrator is able to verify the application in the execution environment in which the application is executing. Thus, before the application is even deployed to the execution environment, the developer and/or administrator is assured that the application will execute properly.

In addition, embodiments of the invention provide a mechanism whereby the list of restricted instructions may be easily extended to encompass additional restricted instructions. Specifically, adding restricted instructions can be performed by updating the repository to encompass more restricted instructions. Accordingly, the verifier is able to verify that an application can execute in multiple different execution environments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, executed by a computer system, for verification of an application comprising:
   identifying a non-global zone of a plurality of zones for executing the application, wherein the plurality of zones execute within a single instance of an operating system, and wherein each of the plurality of zones corresponds to an isolated execution environment within the single instance;
   obtaining a list of permissions for the non-global zone;
   obtaining a restricted instruction listing corresponding to the non-global zone, wherein the restricted instruction listing comprises application restricted instructions and platform restricted instructions;
   analyzing the application to identify a dependent code restricted instruction, wherein analyzing the application comprises:
      comparing a plurality of instructions in the application with the restricted instruction listing to identify which of the plurality of instructions in the application is in the restricted instruction listing;
      identifying a call in the application to dependent code external to the application; and
      comparing a plurality of instructions in the dependent code with the restricted instruction listing to identify the dependent code restricted instruction in the dependent code; and
   generating a report comprising an alert identifying the dependent code restricted instruction when a required permission to execute the restricted instruction is not in the list of permissions.

2. The method of claim 1, further comprising:
   updating the application to remove the dependent code restricted instruction.

3. The method of claim 2, further comprising:
   re-verification of the application after removing the dependent code restricted instruction.

4. The method of claim 1, wherein the platform restricted instructions are further specific to a hardware environment.

5. The method of claim 1, wherein analyzing the application comprises analyzing source code of the application.

6. The method of claim 1, wherein analyzing the application comprises activating a plurality of probes in binary code of the application.

7. The method of claim 6, wherein the probes are restricted instruction specific.

8. The method of claim 6, wherein analyzing the application comprises executing the binary code of the application.

9. The method of claim 8, wherein the probes identify the presence of the dependent code restricted instruction from executing the binary.

10. A system for verification of an application comprising:
   a computer processor;
   an application verification toolkit, configured to execute on the computer processor, and to perform a method, the method comprising:
      identifying a non-global zone of a plurality of zones for executing the application, wherein the plurality of zones execute within a single instance of an operating system, and wherein each of the plurality of zones corresponds to an isolated execution environment within the single instance;
      obtaining a list of permissions for the non-global zone;
      obtaining a restricted instruction listing corresponding to the non-global zone, wherein the restricted instruction listing comprises application restricted instructions and platform restricted instructions;
      analyzing the application to identify a dependent code restricted instruction, wherein analyzing the application comprises:
         comparing a plurality of instructions in the application with the restricted instruction listing to identify which of the plurality of instructions in the application is in the restricted instruction listing;
         identifying a call in the application to dependent code external to the application; and
         comparing a plurality of instructions in the dependent code with the restricted instruction listing to identify the dependent code restricted instruction in the dependent code; and
   a report generator configured to generate a report comprising an alert identifying the dependent code restricted instruction when a required permission to execute the restricted instruction is not in the list of permissions.

11. The system of claim 10, further comprising a client configured to: update the application to remove the dependent code restricted instruction.

12. The system of claim 11, wherein the client is further configured to: re-verify the application after removing the dependent code restricted instruction.

13. The system of claim 10, wherein analyzing the application comprises analyzing source code of the application.

14. The system of claim 10, wherein analyzing the application comprises activating a plurality of probes in binary code of the application.

15. The system of claim 14, wherein analyzing the application comprises executing the binary code of the application.

16. The system of claim 14, wherein the probes identify the presence of the dependent code restricted instruction from executing the binary.

17. A computer readable medium comprising computer readable program code embodied therein for causing a computer system to perform a method for verification of an application, the method comprising:
   identifying a non-global zone of a plurality of zones for executing the application, wherein the plurality of zones execute within a single instance of an operating system, and wherein each of the plurality of zones corresponds to an isolated execution environment within the single instance;

obtaining a list of permissions for the non-global zone;

obtaining a restricted instruction listing corresponding to the non-global zone, wherein the restricted instruction listing comprises application restricted instructions and platform restricted instructions;

analyzing the application to identify a dependent code restricted instruction, wherein analyzing the application comprises:

comparing a plurality of instructions in the application with the restricted instruction listing to identify which of the plurality of instructions in the application is in the restricted instruction listing;

identifying a call in the application to dependent code external to the application; and comparing a plurality of instructions in the dependent code with the restricted instruction listing to identify the dependent code restricted instruction in the dependent code; and generating a report comprising an alert identifying the dependent code restricted instruction when a required permission to execute the restricted instruction is not in the list of permissions.

* * * * *